(12) United States Patent
Daole

(10) Patent No.: US 8,678,580 B2
(45) Date of Patent: Mar. 25, 2014

(54) EYEGLASS SYSTEM

(76) Inventor: Michael Daole, Ashland, OR (US)

( * ) Notice: Subject to any disclaimer, the term of this patent is extended or adjusted under 35 U.S.C. 154(b) by 0 days.

(21) Appl. No.: 13/328,314

(22) Filed: Dec. 16, 2011

(65) Prior Publication Data

US 2012/0154737 A1 Jun. 21, 2012

Related U.S. Application Data

(60) Provisional application No. 61/425,508, filed on Dec. 21, 2010.

(51) Int. Cl.
| | |
|---|---|
| *G02C 11/02* | (2006.01) |
| *G02C 1/00* | (2006.01) |
| *G02C 5/12* | (2006.01) |
| *G02C 5/08* | (2006.01) |

(52) U.S. Cl.
CPC *G02C 5/128* (2013.01); *G02C 5/08* (2013.01); *G02C 11/02* (2013.01)
USPC ............... 351/65; 351/51; 351/63; 351/112

(58) Field of Classification Search
CPC ........... G02C 5/128; G02C 5/08; G02C 11/02
USPC ............. 351/41, 51, 52, 56, 63–81, 111, 112, 351/124, 126

See application file for complete search history.

(56) References Cited

U.S. PATENT DOCUMENTS

| | | | |
|---|---|---|---|
| 266,436 A * | 10/1882 | Crawford | 351/63 |
| 827,740 A * | 8/1906 | Low | 351/155 |
| 1,779,015 A | 10/1930 | Schmitt | |
| 1,898,059 A | 2/1933 | McDonald | |
| 2,042,400 A | 5/1936 | Hon | |
| 2,340,236 A | 2/1944 | Heindselman | |
| 2,766,657 A | 10/1956 | Nathan | |
| 3,883,236 A | 5/1975 | Zipper | |
| 6,033,068 A * | 3/2000 | Spilkin et al. | 351/112 |
| 6,802,604 B2 | 10/2004 | McCormick | |
| D636,009 S | 4/2011 | Hunt | |
| 2011/0170048 A1 | 7/2011 | Shapiro | |

* cited by examiner

*Primary Examiner* — Huy K Mai

(74) *Attorney, Agent, or Firm* — Ostrow Kaufman LLP

(57) ABSTRACT

The present application provides eyeglasses having a frame, supporting reading or other eyeglass lenses, and an adjustable gripping nose pinch. The frame includes integrated therein a decorative spring loaded clip that allows for the attachment of the frame to clothing and objects for storage and convenience.

9 Claims, 3 Drawing Sheets

(Exploded Upper Perspective View)

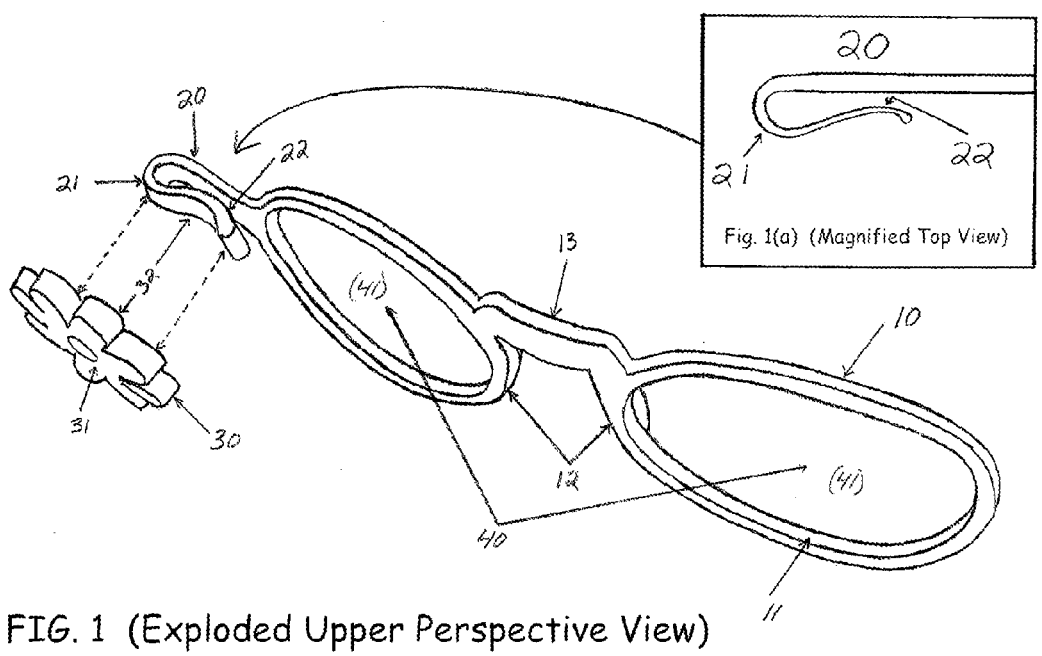
FIG. 1 (Exploded Upper Perspective View)

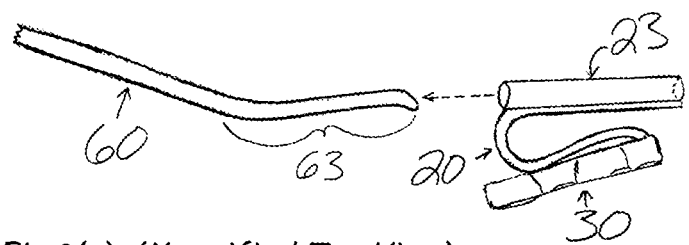
Fig.3(a) (Magnified Top View)
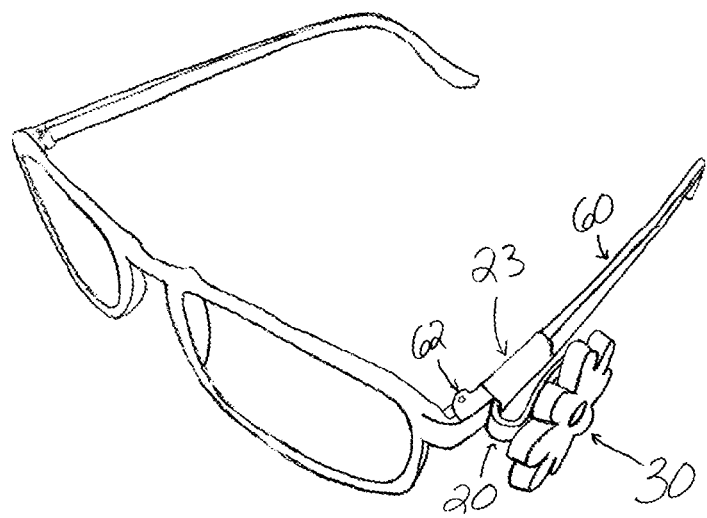
FIG. 3 (4th Alternative Variation)

EYEGLASS SYSTEM

RELATED APPLICATION

This application claims the benefit of U.S. Provisional Application No. 61/425,508, filed Dec. 21, 2010, which is hereby incorporated herein by reference.

BACKGROUND OF THE INVENTION

The present application relates generally to eyeglasses and more specifically to reading and other eyeglasses frames.

A number of eyeglass frame designs exist, however, when not being worn prior eyeglass frames require storage in relatively bulky eyeglass cases or have no storage system at all. As a result, eyeglass wearers place the cases and glasses in a handbag, briefcase, or some other not so convenient location, that may not be accessible the next time the wearer needs to use the glasses. For example, the eyeglass wearer may have left the briefcase at home or in the office. Some wearers own multiple pair of glasses that they leave in multiple locations in the event that one pair is forgotten, e.g., at home or at the office. Although more convenient, there is still the possibility of being caught without a pair of glasses, e.g., at a restaurant, etc. Accordingly, there is a need for eyeglass storage systems that are less bulky and/or otherwise compact, easily carried by the wearer, and that offer immediate access.

SUMMARY OF THE INVENTION

The present application provides reading and other types of glasses with a frame with an integral clip. The frame generally supports reading glass or other lenses. In at least one embodiment, the frame includes a resilient and/or adjustable gripping nose pinch. The integral clip may be spring loaded so as to allow the frame to be attached to clothing and objects for storage and convenience.

There has thus been outlined, rather broadly, some of the features of the eyeglass frames discussed herein in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

The various embodiment discussed herein provide various improvements over prior art systems. Some or all of the embodiments of the systems disclosed herein may therefore exhibit one or more of the following objectives.

An object of at least one embodiment is to provide a reading or other glass systems for providing personalized quickly accessible reading glasses for convenience and enjoyment.

Another object of at least one embodiment is to provide a reading or other glass system that clips-on to garments and objects for storing.

Another object of at least one embodiment is to provide a reading or other glass system that is quickly and easily accessible.

Another object of at least one embodiment is to provide a reading or other glass system that rests solely on the nose for ease of use.

Another object of at least one embodiment is to provide a reading or other glass system that is compact and lightweight.

Another object of at least one embodiment is to provide a reading or other glass system that is personal and enjoyable to use.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE FIGURES

FIG. 1-1a are exploded upper perspective views of eyeglass frames according to at least one embodiment of the frames discussed herein.

FIG. 3-3a are views of eyeglass frames according to at least one embodiment of the framed discussed herein.

DETAILED DESCRIPTION OF THE INVENTION

Figure 2A:
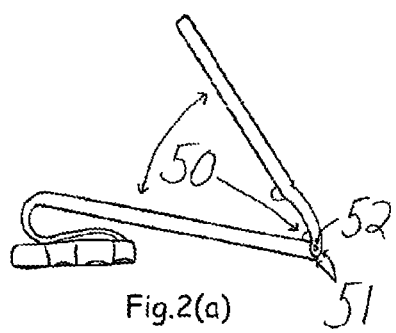
FIG. 2a-2d are an alternatives views of eyeglass frames according to at least one embodiment of the frames discussed herein.

Turning now descriptively to the drawings, in which similar reference characters denote similar elements throughout the several views, the figures illustrate a frame, supporting reading eyeglass lenses, and an adjustable gripping nose pinch, integrated with a decorative spring loaded clip allowing for attachment to clothing and objects for storage and convenience.

Referring to FIG. 1, shown is a frame (10) that houses reading or other eyeglass lenses (40) in housings (11) and has a gripping nose pinch (12) adjustable by a flexible nose bridge (13). That is, the frame (10) is made from a resilient material so that the bridge (13) provides pinching forces at the nose pinch areas (12) that secure the frame (10) to the wearer. The frame may be molded as one continuous piece, with a clip (20) on one lateral end of the frame. FIG. 1a, a magnified top view, shows the clip having a tension spring (21) which gives pressure to the gripping pad (22). Fused to the face of the clip may be a flower decoration or other decorative element that conceals the clip. The bond between the two (32) may be an adhesive or the two pieces may be molded together as one.

Figure 2B:
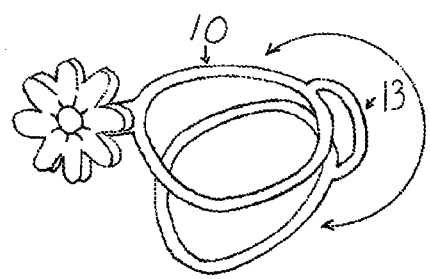
Figure 2C:
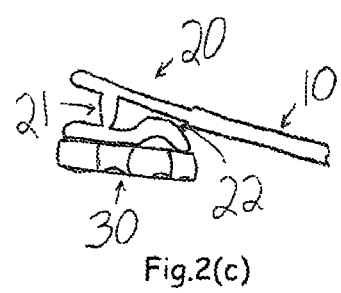
Figure 2D:
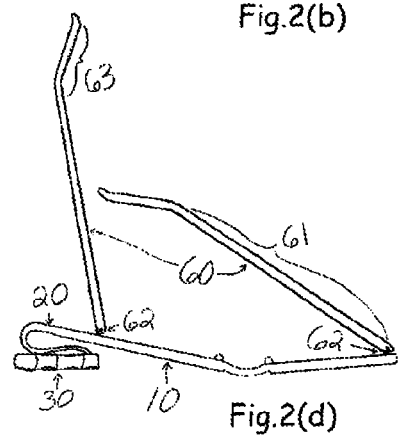

Referring to FIGS. 2a-d, an alternative frame is shown with clip and the addition of temples. FIG. 2a shows the use of a hinge in the frame (10) at the bridge. The two interlocking ends (51) are allowed to move at angles to each other by the use of a pivoting devise (52) allowing the frame to fold in half. FIG. 2b shows the use of a thinner and more flexible nose bridge (13) to allow the frame to fold in half. FIG. 2c shows an alternative clip (20) with its tension spring (21) also acting as a pivot. Pinching the ends of this clip with one's fingers would raise and lower the gripping pad (22) for clasping. FIG. 2d shows the addition of temples (60) to the frame. The temples consist of shafts (61) connected to the frame by hinges (62) and would connect to one's ears by the curls (63) on the temple ends.

FIGS. 3 and 3a, the magnified top view, show the clip (20), iconic decoration (30), and elastic tube (23) as one unit sliding onto an eyeglass temple (60), allowing any common reading glasses to clasp garments and objects.

Frame

The Frame is a structure to hold reading eyeglass lenses and allow for an adjustable grip of a person's nose allowing the frame to rest or otherwise be affixed to the wearer's nose without additional support. The frame has and integrated clasping device or clip.

The frame (10) may be made of a molded plastic composite material manufactured by the methods common to the eyewear industry. The frame (10) includes housings (11) that have fixed therein a pair of reading glass lenses (40). Molded as one continuous piece, the frame has a clip (20) extending from one end that allows the frame (10) to clasp onto garments and objects. The function of clasping onto various locations on garments and objects is the key feature and benefit of these reading glasses (frame) because it allows them to be exceptionally quick to access and convenient to use. The glasses are also exceptionally lightweight and much smaller than average reading glasses in size. In some embodiments, the glasses also rest solely on the nose for support, i.e., without temples (60). The flexible nose bridge (13) allows for different width noses but also provides tension to the gripping nose pinch (12) which are the points on each side of the nose bridge that grip the skin of one's nose. The nose pinch (12) may be molded into the form of the frame but may also have an additional texture applied to their contact points for more grip. The frame (10) may come is many colors and slight variations in shape to accommodate the personal preferences of the consumer.

Variation 1: A likely variation in the frame may be the molding of the frame (10) and the lenses (40) as one continuous piece. All made of the same transparent lens material and mold, the frame may then be painted or pigmented for definition. Variation 2: The flexible nose bridge (13) may be designed and made flexible in such a way as to allow the nose bridge to bend and allow the frame to fold in half, as seen in the alternative front view in FIG. 2b. Variation 3: The use of a hinge (50) in the area of the nose bridge (13) may allow the frames to fold in half as seen in the top view in FIG. 2a. Variation 4: The frame (10) may have additional support in staying on one's nose by the addition of temples (60) as seen in the top view in FIG. 2d. Variation 5: The frame (10) may be made of materials other than plastic, such as metal for example.

Clip

The Clip, as a continuous part of the frame, is a clasping device allowing the reading glass system to fasten to a person's clothing or other objects for storage and convenience.

The clip (20) may be formed as a continuation of the frame (10). The design of the clip may be dictated by the most sensible function and requirements of manufacturing but will likely have at least the two basic components: a tension spring (21) and a gripping pad (22) as shown in two of the possible styles in FIG. 1-1a and 2c.

A variation in the design of the clip (20) is that the iconic decoration (30) and the clip are molded as one continuous piece. It may also be molded as one to the extent that the backside of the iconic decoration becomes the gripping pad (22) of the clip.

Iconic Decoration

The Iconic decoration may be a decoration of one's personal liking affixed to the clip that remains visible to the outside of a garment when the reading glass system is attached and stored.

The iconic decoration (30) that is shown in FIG. 1, for the sake of illustration, is a flower, but the "icons" or images (31) that will be applied here can be of anything. The decoration has two functions. The foremost is that it provides an icon or image that is personal and/or enjoyable to the user, and secondly it covers the clip (20), giving it and the hidden frame a pleasant outward appearance.

The iconic decoration may vary in images, size, textures, and colors to achieve the above functions. Images could be of anything: such as but not limited to hobbies, logos, or photos. The decoration and the clip may be molded as one instead of the decoration being bonded (32) to the clip as is indicated in FIG. 1. The iconic decoration may also be interchangeable, allowing the decoration to be removed and replaced with a different one as the user sees fit. Another variation to the iconic decoration is that it can swivel, allowing the image to be turned vertically or horizontally as the eyeglasses change position from being worn to being stored. Various attachment methods could be used to achieve this.

Lenses

The lenses are optical magnification devices supported by the frame used to improve one's vision. As an "Alternative", lenses may be molded from the same continuous material as the frame.

The lenses may be made of lightweight clear plastic typical of common reading glasses. The lenses (41) may be offered in the typical over-the-counter magnifications and/or can be made to prescription. The lenses and the frame may be molded as one continuous form.

Since there is the possibility of the frame and lenses to be molded as one continuous form, the edges of the lenses nearest the nose bridge (13) may also act as the gripping nose pinch (12) if the lenses are not wrapped by the frame. A texture may then also be added to the edges of the lenses, at the point where they contact the nose, to increase gripping of the skin.

Hinge

As an "Alternative", the Hinge is a pivot device in the area of the nose bridge, allowing frames to fold in half and reduce in size.

As an Alternative to a frame that does not collapse, a hinge (50), as seen in FIG. 2a, may be used to allow the frame to fold in half, reducing its size for storage. The hinge may be located anywhere on the nose bridge (13) to achieve this goal. The hinge has interlocking ends (51) that dovetail together at the point where the frame is designated to fold. The interlocking ends are kept together and allowed to pivot at angles to each other by the use of a pivoting device (52) or pin, as in the case of the hinge seen in FIG. 2a.

The term "hinge" is used herein as a broad term to indicate any style of devise used to allow the frame (10) to fold in half, any hinge may be adapted to achieve this goal.

Temples

As an "Alternative", the Temples are support devices that connect the frame to one's ears.

As an Alternative, temples (60) may be used to support the frame (10) on one's nose. The temples may be molded of the same material as the frame. The shafts (61) of the temples would connect to the frame and be allowed to fold onto the frame by the use of hinges (62) as seen in FIG. 2d. The hinges would be designed in any style that achieves the above goal. Both the interlocking end of the hinge on the frame and the interlocking end of the hinge on the shaft would be molded as part of those respected parts. The curls (63) would be shaped in a way to adequately form around the ears to support the frame (10).

Since the frame (10) may be smaller than the size used for common reading glasses, the temples (60) may take on any shape necessary to achieve the function of connecting the frame to one's ears.

Connections of Main Elements and Sub-Elements

The frame (10) is the fundamental structure, which brings together the various main elements and sub-elements. Into the frame are set a pair of reading glass lenses (40), which have a particular optical magnification (41). The frame rests on one's nose by a relationship between sub-elements of the flexible nose bridge (13) and the gripping nose pinch (12). The frame (10) and all its components can clasp onto garments and objects for storage by the frame-integrated clip. The clip (20) serves to clasp onto garments and objects by a gripping pad (22) that is given pressure to close against the clip by a tension spring (21). An iconic decoration (30) serves to conceal the clip (20) from view when the frame is clasped onto a garment or object for storage. The main elements of the frame (10), clip (20), iconic decoration (30), and the lenses (40) together satisfy the benefits of reading glasses that can clip-on to garments and objects, are convenient, rest solely on the nose, are compact and lightweight, and are personal and enjoyable to use.

1st Alternative Variation: Alternatively, the frame (10) and lenses (40) can be formed together from one continuous mold, and subsequently the edges of the lenses that contact the nose would become the gripping nose pinch (12). 2nd Alternative Variation: Alternatively, the frame (10) may fold or collapse in half. Two possibilities to achieve this goal are seen in FIGS. 2a and 2b, whereby 2a makes use of a hinge (50), and 2b makes use of a more flexible nose bridge (13). 3rd Alternative Variation: Alternatively, the iconic decoration may be interchangeable, allowing the decoration to be removed and replaced with a different one as the user sees fit. 4th Alternative Variation: Alternatively, the iconic decoration may swivel, allowing the image to be turned vertically or horizontally as the eyeglasses change position from being worn to being stored. 5th Alternative Variation: Alternatively, temples (60) as seen in FIG. 2d may be added to the frame to connect to the ears for additional support. 6th Alternative Variation: Alternatively, the clip (20), partnered with the iconic decoration (30), independent from the frame (10), and independent of the above described reading glass system, may attach to the temple of common reading glasses by the use of an elastic tube. As seen in FIG. 3 and magnified top view FIG. 3a, the elastic tube (23) slides over the temple curl (63) and comes to rest near the temple hinge (62). As a result any common pair of reading glasses can clasp onto garments or objects.

Operation of Preferred Embodiment

The frames are stored in the utmost convenient location for the user, usually on the user's garment such as on a jacket lapel or shirt pocket, or on an object that the user carries such as a purse or portfolio. Along with the convenience and ease of accessibility is the added benefit of a personal and enjoyable decoration of an icon or image that disguises the invention's presence when not in use. The iconic decoration (30) conceals a clip (20) that it is bonded to (32). The clip clasps onto the user's garment or object by a tensioning devise or tension spring (21) that applies pressure to the gripping pad (22) forcing the clip to close and clasp. The clip and the frame (10) are molded as one and therefore it is the clip that allows the invention (reading glass system) to clasp onto the most convenient place the user sees fit. When the user is in need of reading glasses, the user may grasp the iconic decoration (30) with his/her fingers and remove the glasses from the storage location. A user may simply place the glasses on her nose. The flexible nose bridge (13) and the gripping nose pinch (12) will automatically accommodate the reading glass system to the size of one's nose and remain on the nose for reading without additional support. When reading is completed the user removes the glasses from the nose and returns them to the storage place. Finally, the reading glasses are stored in a readily accessible location with the added benefit of providing an enjoyable decoration that is meaningful to the user.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

What is claimed is:

1. Eyeglasses having a frame comprising a first and a second housing each housing a lens, a bridge between the first and second housing, a clip extending outward from an end of the frame, and a decorative element affixed to the clip, wherein the clip comprises a planer section extending laterally from an edge of the frame, a planer gripping pad essentially parallel to and opposite the planer section, and a tension spring located between the planer section and the gripping pad that provides clamping pressure between the planer section and the gripping pad, and wherein the decorative element conceals the entirety of the a planer gripping pad, the planer section, and the tension spring when viewed from a front of the decorative element.

2. The eyeglasses of claim 1, wherein at least the bridge is formed of a resilient material, and wherein each of the housings comprise a nose pinch such that the bridge provides pinching forces at the nose pinch.

3. The eyeglasses of claim 1, wherein the frame is molded as a continuous piece.

4. The eyeglasses of claim 1, wherein the frame and the lenses are molded as a continuous piece.

5. The eyeglasses of claim 1, wherein the first and the second housing are further hingedly coupled to each other, allowing the frame to be folded relative to each other.

6. The eyeglasses of claim 1, comprising at least one temple hingedly coupled to an end of the frame.

7. The eyeglasses of claim 6, wherein the planer section of the clip is attached to a tubular element having an opening therein that extents laterally in a direction of the planer section and wherein the tubular element is sliding coupled to the at least one temple such that the planer section, the tension spring, gripping pad, and decorative element are removable from the at least one temple as a unit.

8. The eyeglasses of claim 7, wherein the tubular element is elastic.

9. Eyeglasses having a frame comprising a first and a second housing each housing a lens, a bridge between the first and second housing formed of a resilient material and arranged so as to provide pinching forces at a nose pinch when worn at each of the first and second housing, a clip extending outward from an end of the frame, and a decorative element affixed to the clip, wherein the clip comprises a planer section extending laterally from an edge of the frame, a planer gripping pad essentially parallel to and opposite the planer section, and a tension spring located between the planer section and the gripping pad that provides clamping pressure between the planer section and the gripping pad, and wherein the decorative element conceals the entirety of the a planer gripping pad, the planer section, and the tension spring when viewed from a front of the decorative element.

* * * * *